United States Patent [19]

Warner, III

[11] Patent Number: 5,649,889
[45] Date of Patent: Jul. 22, 1997

[54] STRESS ALLEVIATING GUIDE ROLL FOR HIGH TEMPERATURE APPLICATIONS

[75] Inventor: Alvin L. Warner, III, Baldwin, Md.

[73] Assignee: Bethlehem Steel Corporation

[21] Appl. No.: 319,510

[22] Filed: Oct. 6, 1994

[51] Int. Cl.$^6$ .................................................. B21B 13/02
[52] U.S. Cl. ........................... 492/16; 492/47; 164/448; 164/442
[58] Field of Search ........................... 492/1, 2, 16, 45, 492/47; 164/442, 448

[56] References Cited

U.S. PATENT DOCUMENTS

| | | | |
|---|---|---|---|
| 1,279,535 | 4/1918 | Baninger | 384/905 |
| 2,558,455 | 6/1951 | Nvak | 384/418 |
| 2,813,764 | 11/1957 | Brittain, Jr. | 384/905 |
| 3,438,425 | 4/1969 | Butkevich et al. | 164/448 |
| 3,879,827 | 4/1975 | Lehmann | 492/2 |
| 3,949,455 | 4/1976 | Biondetti | 492/2 |
| 3,965,974 | 6/1976 | Sernetz et al. | 164/448 |
| 4,076,341 | 2/1978 | Scheurecker et al. | 384/419 |
| 4,137,963 | 2/1979 | Langer et al. | 164/442 |
| 4,164,252 | 8/1979 | Scheurecker | 164/448 |
| 4,222,433 | 9/1980 | Marti et al. | 164/448 |
| 4,226,485 | 10/1980 | Pruvot | 384/905 |
| 4,351,383 | 9/1982 | Gladwin | 164/442 |
| 4,416,137 | 11/1983 | Marshall | 492/1 |
| 4,442,883 | 4/1984 | Yamakami et al. | 164/442 |
| 4,485,836 | 12/1984 | Streubel et al. | 164/442 |
| 4,577,673 | 3/1986 | Harada et al. | 164/442 |
| 4,577,674 | 3/1986 | Harada et al. | 164/442 |
| 4,577,678 | 3/1986 | Ishiara et al. | 164/442 |
| 4,660,268 | 4/1987 | Evans | 492/47 |
| 4,676,297 | 6/1987 | Kriegner et al. | 164/442 |
| 4,800,644 | 1/1989 | Muellenberg | 492/45 |
| 4,986,178 | 1/1991 | Hafner et al. | 100/174 |
| 5,209,283 | 5/1993 | Miltzow et al. | 164/442 |
| 5,279,535 | 1/1994 | Hawes et al. | 164/442 |

*Primary Examiner*—Larry I. Schwartz
*Assistant Examiner*—Marc W. Butler
*Attorney, Agent, or Firm*—Harold I. Masteller, Jr.

[57] ABSTRACT

A guide roll having means to expand or contract independent of its support bearings to prevent bearing failures when used under elevated temperature conditions.

7 Claims, 3 Drawing Sheets

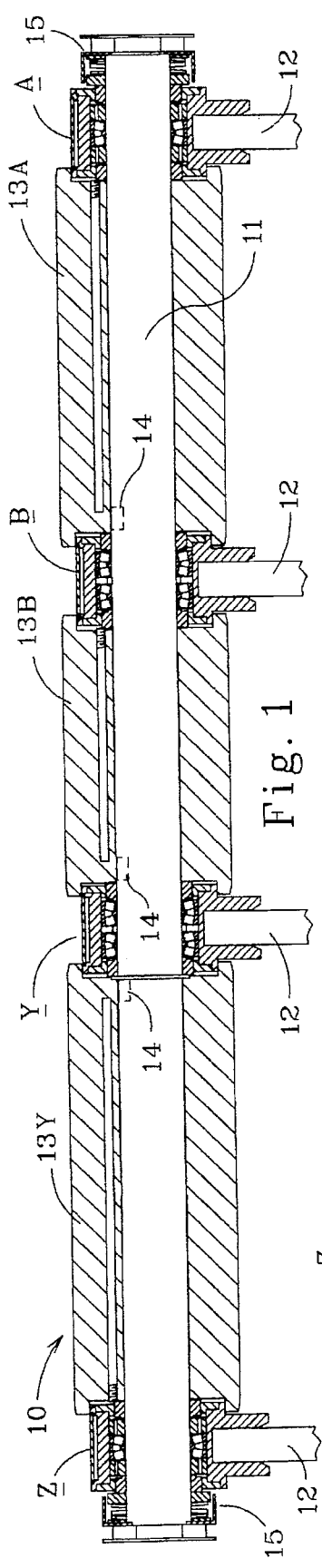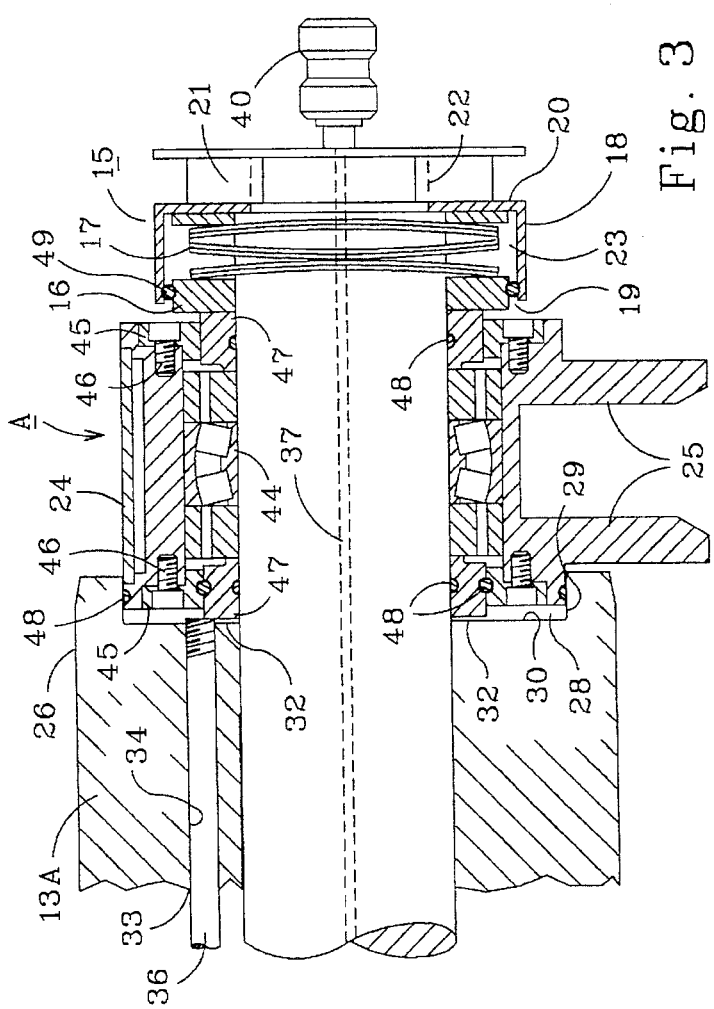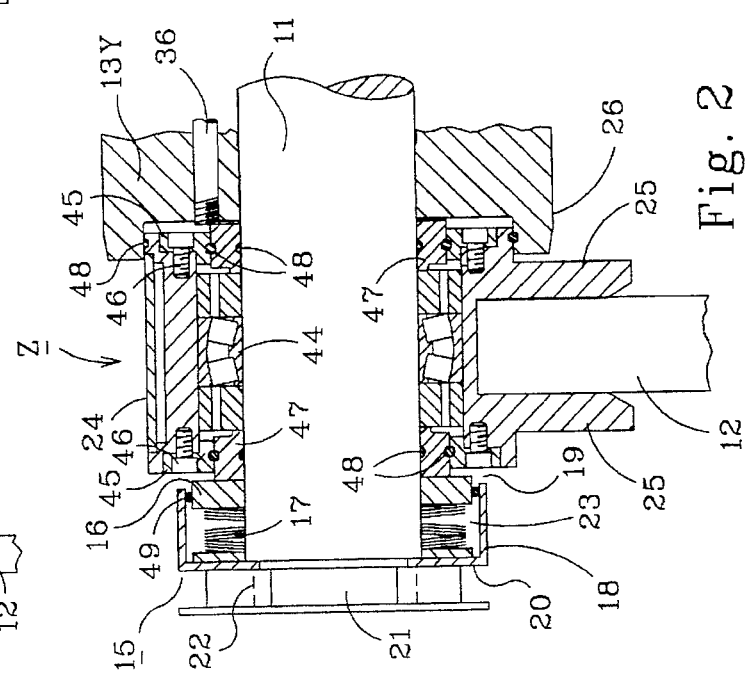

STRESS ALLEVIATING GUIDE ROLL FOR HIGH TEMPERATURE APPLICATIONS

BACKGROUND OF THE INVENTION

This invention relates to guide rolls for supporting a hot workpiece under elevated temperature conditions, and in particular to continuous caster guide rolls having means to alleviate internal thermal stress caused by both the hot cast strand and ambient temperatures.

In continuous casting operations solidification of the cast molten steel starts in a water cooled mold and continues progressively as the strand moves from the mold, through secondary water spray cooling zones and onto a straightener for further processing. A plurality of guide rolls are arranged to support and guide the hot strand toward the straightener. Guide roll arrangements vary with each different caster design, however, they typically comprise 1) a fixed vertical set of rolls positioned immediately below the caster mold, 2) a set of bend unit rolls positioned to initiate a direction change from vertical strand movement to horizontal strand movement, and 3) a curved rack of guide rolls positioned to guide the strand onto the straightener.

During continuous casting operations radiant heat is emitted from the hot cast strand and causes the guide rolls to expand circumferentially as well as or grow along their longitudinal axis. The extra expanded roll length impacts upon the bearings of the guide roll assembly, generates uneven lateral and radial forces against the bearings, and causes stuck rolls and/or bearing failure. Additionally, from time to time it may be necessary to slow down casting speeds to meet various shop conditions. Under such circumstances the rotational speed of the guide rolls may be reduced to as little as one revolution per every six minutes. At such slower casting speeds temperature differentials along the roll circumference can be raised to as much as 600° F. These temperature differentials are due to one side of the guide roll being positioned adjacent the hot cast strand while the opposite side of the guide roll is being emersed in secondary cooling sprays. The wide temperature differential between opposite sides of the guide roll produces unequal roll growth, bulging, and generates asymmetrical lateral and radial forces against the bearings supporting the guide roll.

The problems and failures described above add unwanted expense to continuous casting operations. Bearing failures require shutdown for maintenance, repair, and replacement of rollers and bearings. And, in extreme instances, stuck rolls rupture the thin solidified skin forming along the hot cast strand and cause a breakout, a dangerous eruption of molten steel spewing from the molten core of the strand.

SUMMARY OF THE INVENTION

It is therefore an object of this invention to provide an improved guide roll which will avoid the aforementioned problems and failures incurred by prior guide roll designs.

It is a further object of this invention to provide a guide roll which will not generate increased lateral and radial stress on the bearings when used in hot environments.

It is still a further object of this invention to provide an improved guide roll which can either expand or contract along its length independent of its guide roll bearings.

And finally, it is still a further object of this invention to provide a guide roll which will not generate additional lateral stress with an increase in temperature differential along the roll.

We have discovered that the foregoing objects can be attained with a guide roll assembly having one or more roll sleeves fastened to a shaft journaled within a plurality of spaced apart bearings. Each roll sleeve extends between two of the spaced apart bearings and includes expansion pins extending from the first end of the roll sleeve to engage the first bearing and hold the opposite end of the roll sleeve fast against the second bearing thereby forcing thermal stress along the roll sleeve length toward the first roll sleeve end positioned proximate the first bearing.

BRIEF DESCRIPTION OF THE DRAWINGS

FIG. 1 is a cross-section of the preferred embodiment of the guide roll invention.

FIG. 2 is a cross-section showing one end bearing arrangement of the preferred embodiment.

FIG. 3 is a cross-section showing the end bearing arrangement opposite FIG. 2.

DETAILED DESCRIPTION OF THE PREFERRED EMBODIMENT

Figure 7:
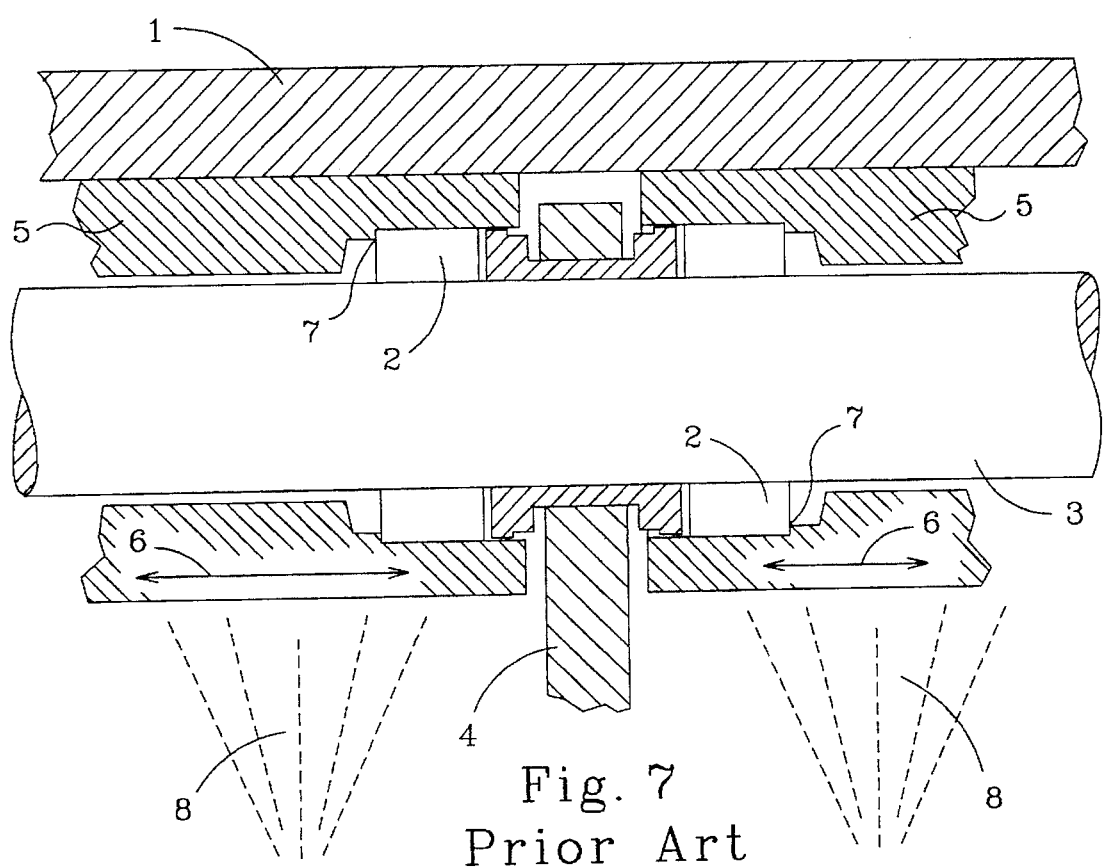
FIG. 7, a prior art Voest-Alpine guide roll used in state-of-the-art continuous casters.

Referring to FIG. 7 of the drawings labeled "Prior Art", a portion of a state-of-the-art guide roll assembly is shown comprising a plurality of bearings 2 spaced along a fixed shaft 3 supported upon beams or girders 4. Roll sleeves 5 extend between adjacent bearings 2, and the roll sleeves encircle shaft 3. The ends of the roll sleeves are attached to bearings 2 to enable the roll sleeves to rotate about fixed shaft 3.

Roll sleeves 5 both support and guide the hot cast strand 1, flowing from the caster mold, toward the finish end of the caster. Radiant heat from the cast strand causes sleeves 5 to expand in both directions along their length as shown by arrows 6. The ends of sleeves 5 are seated against bearings 2 as shown at reference number 7, and the thermal growth of the sleeves increases lateral stress against bearings 2 causing bearing failures.

Additionally, when there is a substantial temperature differential along the circumference of a roll sleeve, the hotter sleeve surface expands at a greater rate than the colder surface. Under such circumstances the sleeve tends to bulge and produce asymmetrical lateral and radial forces against the bearings.

For example, if we consider the normal casting speed to be about 60"/min., and if the roll sleeve is 20" in diameter, it would take approximately one minute to make one complete revolution of the roll sleeve through its hottest position adjacent the strand 1 and its coldest position adjacent the secondary cooling sprays 8. Under such normal casting speeds the temperature differential along the sleeve circumference tends to be small. However, when operations demand a change to slower casting speeds, say 10" per minute, it can take up to 6 minutes 19 complete one revolution of the roll sleeve through its hot and cold positions, and the temperature differential along the sleeve circumference can be as much as 600° F. Under these slower speeds we have recorded surface temperatures of 800° F. adjacent the hot cast strand and 200° F. at the secondary cooling sprays. These wide temperature differentials causes the roll sleeves 5 to deform, bulge, and exert uneven lateral and radial forces against the bearing.

Referring now to FIG. 1 of the drawings, the preferred embodiment of the present guide roll invention 10 includes a rotatable shaft 11 extending through a plurality of bearings "A" through "Z". Bearings "A"–"Z" are supported by beams or girders 12, and roll sleeves 13A through 13Y extend between adjacent bearings "A"–"Z". Each roll sleeve is fastened to rotatable shaft 11 by a key 14 to force the roll sleeves and rotatable shaft 11 to rotate together.

As more clearly shown in FIGS. 2 and 3, each end of rotatable shaft 11 is provided with a thrust absorbing assembly 15 positioned adjacent the end bearings "A" and "Z". Each thrust absorbing assembly 15 includes a pressure plate 16, a compression spring arrangement 17, and a housing 18. The thrust absorbing assemblies compensate for lateral forces which may be transferred into the rotatable shaft 11 as roll sleeves 13A through 13Y expand or contract under changing thermal conditions.

Housing 18 includes an open end 19 adapted to receive the compression spring arrangement 17, and a closed end 20 including a fastener 21 for attaching housing 18 to the threaded ends 22 of rotatable shaft 11. A seal 49, or similar means, is positioned between the inside wall of housing 18 and pressure plate 16 to seal compression spring 17 within space 23 of the thrust absorbing assemblies. The compression spring encircles the rotatable shaft 11, and pressure plate 16 is positioned between the end bearing and compression spring 17.

Bearings "A" through "Z" are pillow block type bearings and are spaced apart along rotatable shaft 11. Each bearing assembly includes an outer housing 24 having flanges 25 for attachment to a support beam 12. The bearings "A" through "Z" assemblies also include at least one roller type bearing 44 positioned between a pair of spacer ring assemblies, each spacer ring assembly having an outer ring 45 fastened to housing 24 by machine screws 46 and an inner ring 47 positioned adjacent the roller bearing 44 and encircling the rotatable shaft 11. Seals 48 are positioned between the inner ring 47 and the outer ring 45, between the inner ring 47 and shaft 11, and between the outer ring 45 and roller sleeves 13A through 13Y to prevent the leakage of any lubricating or cooling fluids contained within housing 24. The roll sleeves 13A through 13Y are positioned between adjacent pairs of bearing assemblies. The roll sleeve includes a pair of end roll sleeves 13A and 13Y and intermediate roll sleeves 13B through 13X.

The end sleeve 13A extends between end bearing "A" and intermediate bearing "B". Likewise, the opposite end roll sleeve 13Y extends between end bearing "Z" and intermediate bearing "Y". Except for their overall length, which may vary to fit uneven spacing between support beams 12, end roll sleeves 13A and 13Y are opposite hand. Therefore, although the following description is directed to the end roll sleeve 13A, it also pertains to end roll sleeve 13Y.

Figure 4:
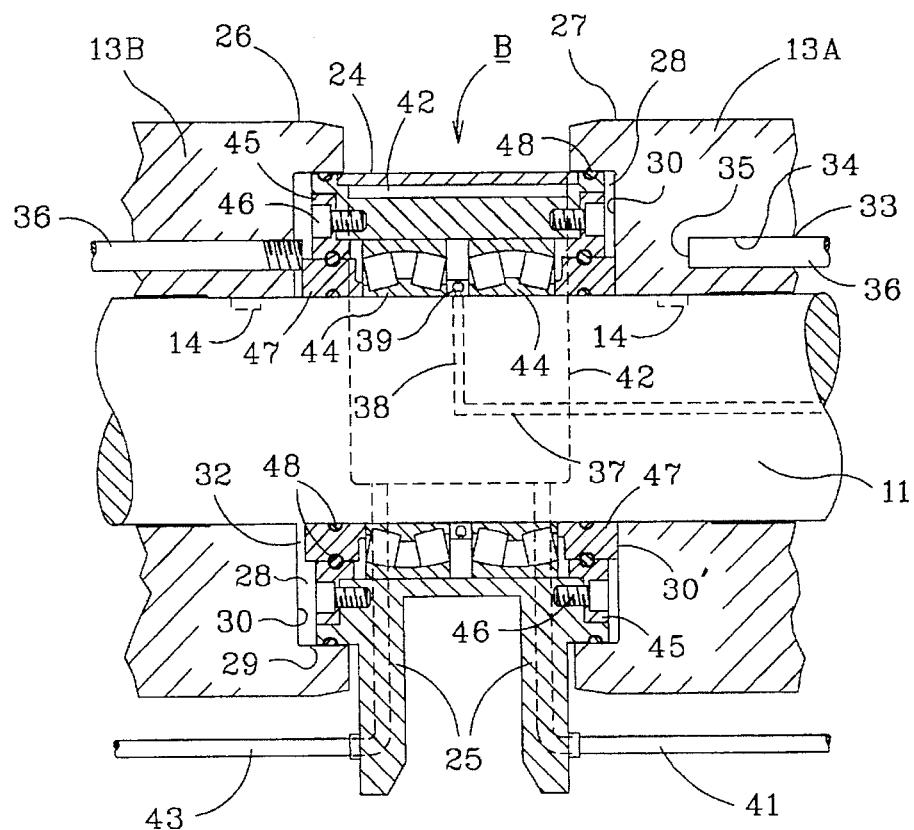
FIG. 4 is a cross-section of the intermediate bearing adjacent FIG. 3.
Figure 5:
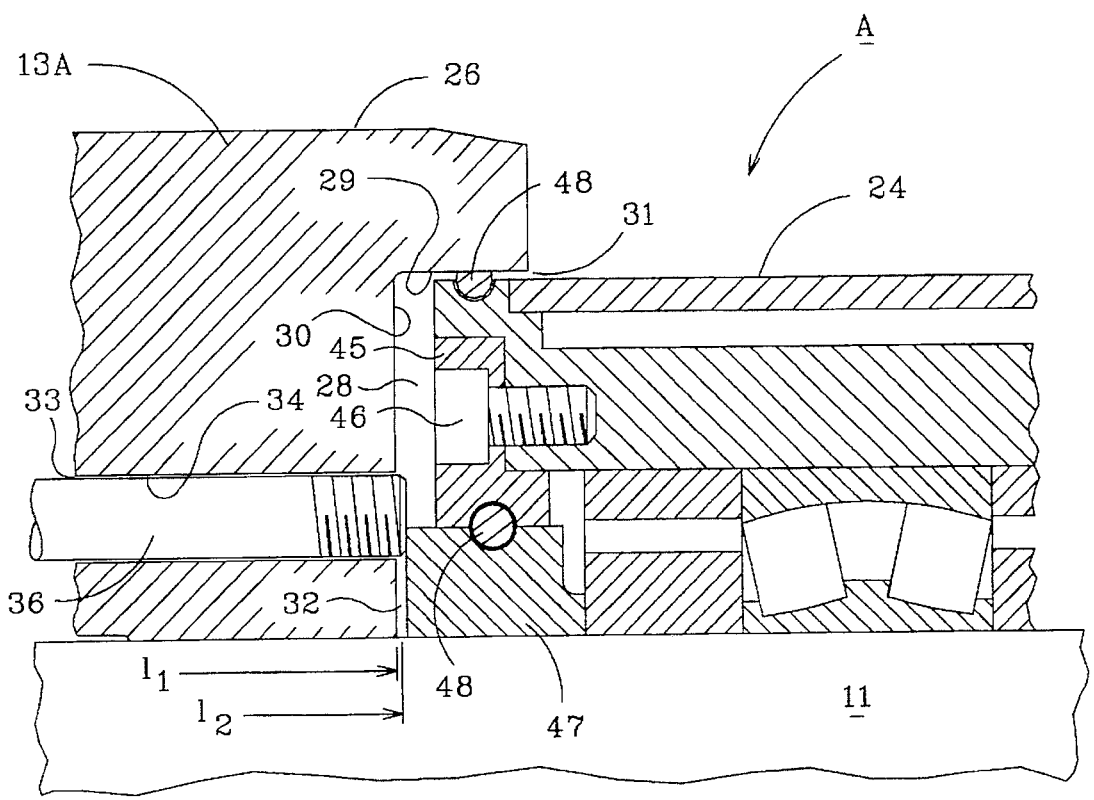
FIG. 5 is an enlarged cross-section of the end bearing shown in FIG. 3.

Referring now to FIGS. 3 through 5, end roll sleeve 13A extends between end bearing "A" and intermediate bearing "B" and includes a first end 26 and a second end 27. In the two end roll sleeves 13A and 13Y, the first end 26 is positioned outboard from its inboard second end 27 located adjacent an intermediate bearing. This can be seen more clearly in the enlarged details of FIGS. 2 and 3 showing the outboard first end 26, and FIG. 4 showing the inboard second end 27. Both ends 26 and 27 include a recess 28 having sidewalls 29 and a base portion 30. The sidewalls 29 encircle a portion of the outer housing 24 of their respective adjacent "A" and "B", and, as more clearly shown in FIG. 5, a space 31 is provided therebetween to provide clearance between the outer housing 24 and roll sleeve 13A. The base portion 30 of second end 27, shown in FIG. 4, is positioned to abut against intermediate bearing "B" as shown at 30', and the opposite base portion 30 of the first end 26, as shown in FIG. 3, is positioned adjacent end bearing "A" to provide a space 32 between base portion 30 and end bearing "A".

Longitudinal apertures 33 extend from base portion 30 of first end 26 in FIG. 3 to a location within the end roll sleeve 13A as shown in FIG. 4. The longitudinal apertures 33 include sidewalls 34 shown in FIG. 5 and a base 35 shown in FIG. 4. Expansion pins 36 are inserted into each longitudinal aperture 33 to bear against base 35 and extend outward to engage a surface of end bearing "A". Expansion pins 36 are threaded along their outward ends to provide means for removing any stuck expansion pins during maintenance of the guide roll assembly.

Figure 6:
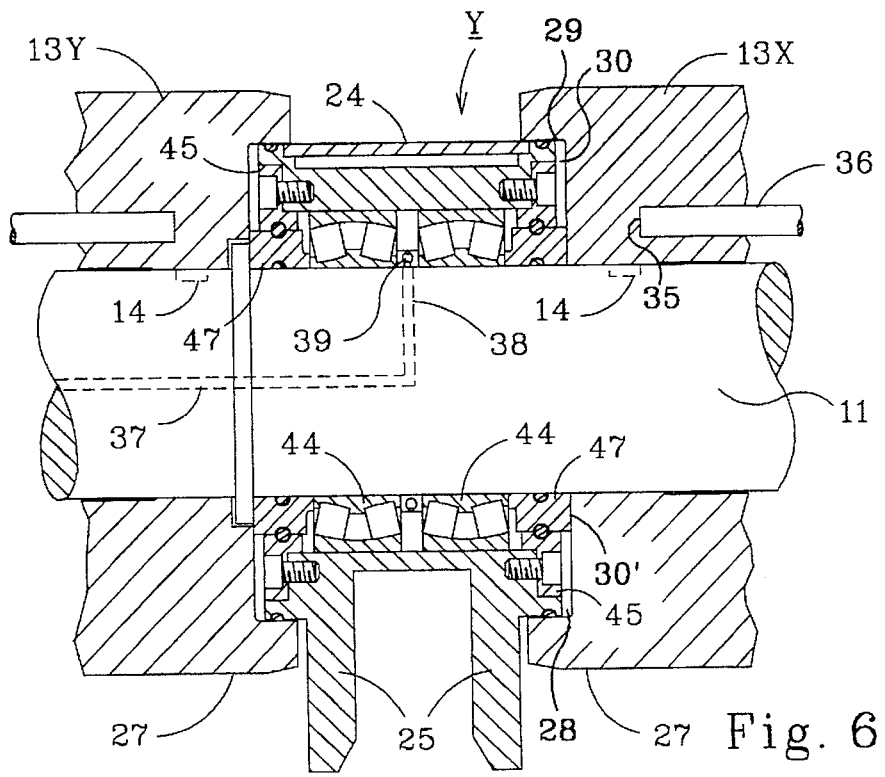
FIG. 6 is a cross-section of the intermediate bearing adjacent FIG. 2.

As shown in the enlarged FIG. 5, clearance is provided between sidewalls 34 and the expansion pins 36. The clearance provides a sliding fit within the longitudinal apertures while the outward end of the expansion pins 36 engage end bearings A and hold base 30 of the second end 27 fast against the intermediate bearing "B" as shown by reference number 30'. Likewise, as shown in FIGS. 4 and 6, the intermediate roll sleeves 13B through 13X are positioned between intermediate bearings "B" through "Y", and each intermediate roll sleeve 13B through 13X includes a first end 26 shown in FIG. 4 and a second end 27 shown in FIG. 6. The first end 26 of each intermediate roll sleeve 13B through 13X is positioned to place the base portion 30 of recess 28 adjacent a first bearing, for example intermediate: bearing "B" in FIG. 4, to provide a space 32 between the first end base 30 and the first bearing. The opposite, second end 27 of each intermediate roll sleeve 13B through 13X is positioned to place its base 30 against a second bearing, for example such as intermediate bearing "Y" in FIG. 6. The intermediate roll sleeves 13B through 13X include expansion pins 36 inserted into apertures 33 similar to the configuration shown for the end sleeves 13A and 13Y. The expansion pins 36 extend from base 35 of the apertures 33 within each intermediate roll sleeve and bear against each first bearing, such as intermediate bearing "B" in FIG. 4, to hold base 30 of the second end 27 fast against the second bearing shown by reference number 30' in FIG. 6.

Although the preferred embodiment shows the intermediate roll sleeves having expansion pins 36 extending outward toward end bearing "A", it should be understood that the intermediate guide roll sleeves could be reversed to extend the expansion pins 36 toward end bearing "Z" without departing from the scope of this invention.

The roll guide assembly 10 may include means for internally lubricating bearings "A" through "Z". Lubricant can be supplied to one end or both ends of the roll guide assembly as shown in FIGS. 3, 4, and 6. The lubricating means comprise a lubricant reservoir (not shown), a feed line 37 extending through the rotatable shaft 11, lateral feed lines 38 having injectors or nozzles 39 for delivering the lubricant to the bearings, and a coupling 40 for attaching the lubricant reservoir to feed line 37.

Similarly, bearing assemblies "A" through "Z" may also include means to cool bearings "A" through "Z" by removing the radiant heat generated by the cast slab. The cooling means includes a water supply (not shown), a supply line 41, a water jacket 42 formed within housing 24, and a discharge line 43. As best shown in FIG. 4, the coolant enters the water jacket via supply line 41, circulates upward toward the housing surface adjacent the hot slab, and is discharged through line 43.

During shutdown or idled conditions the cold roll sleeves 13A through 13Y are contracted to their smallest lengthwise measurement and provide a maximum clearance dimension at space 32 located between the roll sleeve first end 26 and its adjacent bearing. Knowing that linear expansivity is the fractional increase in length of a solid per unit rise in temperature, the increase in roll sleeve length from its cold length $l_1$ to its hot operational length $l_2$, shown in FIG. 5, can be calculated.

Referring once again to FIGS. 3 through 5, we will use end roll sleeve 13A as an example to show how the guide roll invention compensates for thermal stress buildup along the length of the roll sleeves, however, it should be understood that the following description will apply to all roll sleeves 13A through 13Y of the present invention.

In FIG. 5 end roll sleeve 13A is shown under cold conditions having a length $l_1$. As the caster is brought into operation, and as the hot cast strand begins to roll across the roll sleeve, the surface temperature rises and the roll sleeve expands or grows along its length. As heretofore described, second end 27 of the roll sleeve is positioned against inner bearing "B" at 30' and the opposite first end 26 is positioned adjacent but not contacting end bearing "A" to provide a space or gap 32. Expansion pins 36 engage end bearing "A" and base 35 of apertures 33, and the expansion pins 36 hold base 30 of second end 27 fast against intermediate bearing "B" at 30' as shown in FIG. 4. Because expansion pins 36 loosely engage the sidewalls 34 of the apparatus 33, and because space 32 provides clearance for linear expansion, the roll sleeve is free to expand in a single direction along the path of least resistance toward first end 26 adjacent end bearing "A".

Space 32 is greater than the coefficient of expansion for the roll sleeve shown by the different lengths $l_1$ and $l_2$. As clearly shown in FIG. 5, the direction of roll sleeve growth is controlled by expansion pins 36 and the roll sleeves are able to expand from their cold length $l_1$ to their hot length $l_2$ without exerting additional lateral forces against adjacent bearings.

While this invention has been described as having a preferred design, it is understood that it is capable of further modifications, uses and/or adaptations of the invention, following the general principle of the invention and including such departures from the present disclosure as come within known or customary practice in the an to which the invention pertains, and as may be applied to the central features hereinbefore set forth, and falls within the scope of the invention of the limitations of the appended claims.

I claim:

1. A guide roll having means to alleviate thermal stress comprising:
   a) a shaft rotatably journaled within a first end bearing, a second end bearing and a plurality of intermediate bearings spaced apart between said first end bearing and said second end bearing;
   b) a first end roll sleeve encircling said shaft and fastened thereto for simultaneous rotation with said shaft and including;
      i) an inboard end positioned against an intermediate bearing,
      ii) an outboard end positioned proximate said first end bearing to provide a space between said outboard end and said first end bearing, said outboard end including at least one aperture having a sidewall extending inward from said outboard end to an aperture base located within said first end roll sleeve, and
      iii) at least one expansion pin slidably engaging said sidewall and extending from said aperture base to said first end bearing, said at least one expansion pin fixed between said aperture base and said first end bearing to hold said inboard end fast against said intermediate bearing, said at least one expansion pin slidably engaging said sidewall to provide means for said first end roll sleeve to thermally expand independent of said at least one expansion pin toward said space provided between said outboard end and said first end bearing;
   c) a second end roll sleeve encircling said shaft and fastened thereto for simultaneous rotation with said shaft and including;
      i) an inboard end positioned against an intermediate bearing,
      ii) an outboard end positioned proximate said second end bearing to provide a space between said outboard end and said second end bearing, said outboard end including at least one aperture having a sidewall extending inward from said outboard end to an aperture base located within said second roll sleeve, and
      iii) at least one expansion pin slidably engaging said sidewall and extending from said aperture base to said second end bearing, said at least one expansion pin fixed between said aperture base and said second end bearing to hold said inboard end fast against said intermediate bearing, said at least one expansion pin slidably engaging said sidewall to provide means for said second end roll sleeve to thermally expand independent of said at least one expansion pin toward said space provided between said outboard end and said second end bearing; and
   d) at least one intermediate roll sleeve encircling said shaft and fastened thereto for simultaneous rotation with said shaft and including;
      i) a first end positioned against a first intermediate bearing,
      ii) a second end positioned proximate a second intermediate bearing to provide a space between said second end and said second intermediate bearing, said second end including at least one aperture having a sidewall extending inward from said second end to an aperture base located within said at least one intermediate roll sleeve, and
      iii) at least one expansion pin slidably engaging said sidewall and extending from said aperture base to said second intermediate bearing, said at least one expansion pin fixed between said aperture base and said second intermediate bearing to hold said first end fast against said first intermediate bearing, said at least one expansion pin slidably engaging said sidewall to provide means for said at least one intermediate roll sleeve to thermally expand independent of said at least one expansion pin toward said space provided between said second end and said second intermediate bearing.

2. The guide roll invention of claim 1 wherein:
   a) said at least one expansion pin slidably engaging said sidewall extending inward in said first end roll sleeve is fixed between said aperture base and said first end bearing to force said first end roll sleeve to thermally expand in a single direction toward said space provided between said outboard end and said first end bearing;

b) said at least one expansion pin slidably engaging said sidewall extending inward in said second end roll sleeve is fixed between said aperture base and said second end bearing to force said second end roll sleeve to thermally expand in a single direction, toward said space provided between said outboard end and said second end bearing; and c) said at least one expansion pin slidably engaging said sidewall extending inward in said at least one intermediate roll sleeve is fixed between said aperture base and said second intermediate bearing to force said at least one intermediate roll sleeve to thermally expand in a single direction toward said space provided between said second end and said second intermediate bearing.

3. The guide roll invention of claim 1 wherein:

a) said at least one expansion pin slidably engaging said sidewall extending inward in said first end roll sleeve is fixed between said aperture base and said first end bearing to force said first end roll sleeve to thermally contract in a single direction away from said space provided between said outboard end and said first end bearing;

b) said at least one expansion pin slidably engaging said sidewall extending inward in said second end roll sleeve is fixed between said aperture base and said second end bearing to force said second end roll sleeve to thermally contract in a single direction away from said space provided between said outboard end and said second end bearing; and c) said at least one expansion pin slidably engaging said sidewall extending inward in said at least one intermediate roll sleeve is fixed between said aperture base and said second intermediate bearing to force said at least one intermediate roll sleeve to thermally contract in a single direction away from said space provided between said second end and said second intermediate bearing.

4. The guide roll invention of claim 1 wherein:

a) said first end roll sleeve includes;
 i) an inboard end having a recessed portion including a base positioned against said intermediate bearing, and
 ii an outboard end having a recessed portion including a base positioned proximate said first end bearing to provide said space between said outboard end and said first end bearing, said space being located between said base of the recessed portion and said first end bearing;

b) said second end roll sleeve includes;
 i) an inboard end having a recessed portion including a base positioned against said intermediate bearing, and
 ii) an outboard end having a recessed portion including a base positioned proximate said second end bearing to provide said space between said outboard end and said second end bearing, said space being located between said base of the recessed portion and said second end bearing; and c) said at least one intermediate roll sleeve includes;
 i) a first end having a recessed portion including a base positioned against said first intermediate bearing, and
 ii) a second end having a recessed portion including a base positioned proximate said second intermediate bearing to provide said space between said second end and said second intermediate bearing, said space being located between said base of the recessed portion and said second intermediate bearing.

5. The guide roll invention of claim 4 wherein:

a) said space between said base of the recessed portion and said first end bearing is greater than a difference between a maximum thermally expanded roll sleeve length $l_2$ and a minimum thermally contracted roll sleeve length $l_1$.

b) said space being located between said base of the recessed portion and said second end bearing is greater than a difference between a maximum thermally expanded roll sleeve length $l_2$ and a minimum thermally contracted roll sleeve length $l_1$.

c) said space being located between said base of the recessed portion and said second intermediate bearing is greater than a difference between a maximum thermally expanded roll sleeve length $l_2$ and a minimum thermally contracted roll sleeve length $l_1$.

6. The guide roll invention of claim 1 wherein at least one end of said guide roll includes a thrust absorbing assembly having a compressible means to alleviate thermal stress along said shaft.

7. The guide roll invention of claim 6 wherein said thrust absorbing assembly includes a housing fastened to at least one end of said shaft and enclosing compression springs positioned along a length of said shaft between a surface of said housing and a pressure plate adjacent a bearing said shaft is journaled within.

* * * * *